Figure 1:
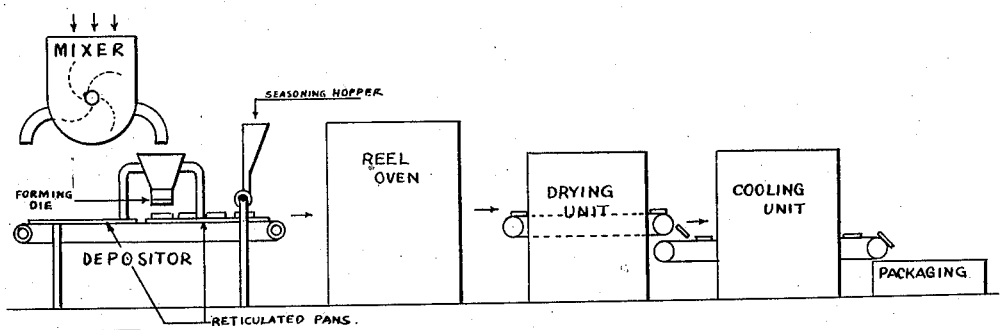

April 25, 1950 A. T. JOHNSON 2,505,407
PROCESS FOR MAKING RYE FOOD PRODUCTS
Filed Nov. 15, 1946

Inventor
ADOLPH T. JOHNSON,
By McMorrow, Berman & Davidson
Attorneys

Patented Apr. 25, 1950

2,505,407

UNITED STATES PATENT OFFICE 2,505,407

PROCESS FOR MAKING RYE FOOD PRODUCTS

Adolph T. Johnson, Hutchinson, Kans.

Application November 15, 1946, Serial No. 709,937

4 Claims. (Cl. 99—90)

This invention relates to novel food products and to process for making them. More particularly it relates to baked products containing as the major ingredient rye, in the form of rye graham flour, coarse milled whole rye flour, whole rye flakes or rolled rye. Still more particularly, this invention relates to crisp rye products of forms other than crackers or biscuits.

It is well known that rye flour, in any of the forms mentioned above, behaves quite differently than does wheat flour. Particular difficulty has been encountered in preparing crackers or biscuits from it because of the tendency to form hard plastic products instead of the desired crisp, friable biscuit, even when leavened with yeast. It was discovered by a Swedish manufacturer that improved crispness could be obtained by beating and aerating the batter. Since this discovery, rye batter is almost universally beaten and aerated when a crisp product is desired, the yeast which was formerly used as a leavening agent being often omitted from the batter.

Despite this discovery, the rye baking industry has developed slowly and even today produces a very limited number of products. Of these the best known is a cracker known as "Ry-Krisp," which is produced by extruding a continuous band of dough onto a surface which is dusted with flour. Additional flour is then dusted on the upper side of the dough. The object of the flour dusting is to prevent the dough from sticking to the surface and as it passes through subsequent forming operations prior to baking. Flour dusting has certain disadvantages in that the finished product is less crisp and less attractive in appearance than an undusted biscuit. In addition, the flour coating is more susceptible to being attacked by flour weevils than is the undusted product. However, despite these disadvantages, all crisp rye products made today are flour dusted, since it has been believed necessary in order to prevent sticking during the various required forming operations.

Even with the step of flour dusting, it has not been found possible to produce any considerable variety of shapes of rye biscuits or crackers. Only thin, square or rectangular biscuits are now produced.

It is an object of my invention to make possible the manufacture of rye products of the cookie type in a wide variety of attractive shapes and sizes and to provide a process for their manufacture. It is a further object to provide a process in which forming of the rye batter forms of the cookie type takes place in a single operation. It is a still further object to make possible the elimination of the flour dusting step with its attendant disadvantages. A further object is to permit seasoning materials such as caraway seeds and the like to be added, and to permit the rye products of the cookie type to be irradiated to enhance the natural grain content of vitamin D. A still further object is to provide a continuous process in which the rye batter is formed into the desired shapes seasoned, baked, dried, cooled and packaged without intermediate manual handling. Still other objects will become apparent from the detailed description of my invention which follows.

Briefly stated, my process comprises forming a light rye batter, extruding the batter into articles of predetermined form, depositing said articles to a supporting surface, baking said articles, and subjecting the thus baked articles to dehydration to convert same to the desired degree of crispness.

The batter which is to be used in my process consists primarily of rye, in the form of rye graham flour, coarse milled whole rye flour, whole rye flakes or rolled rye, as stated above. Flour of other types may be admixed if desired. The batter is made up with water and may contain in addition milk, milk solids, salt, flavoring, spices, malt, coloring materials or other mineral or chemical materials. The batter is either beaten or aerated or both beaten and aerated until it is light and fluffy. If desired, the batter may be made light and fluffy, without being beaten or aerated or beaten and aerated, by incorporating therein yeast or like leavening agent. Then also, the batter may be made light and fluffy by the addition of yeast or like leavening agent to the batter mix and then beating or aerating or beating and aerating the batter mix. For a final rye product which is irradiated so as to enhance the natural grain content of vitamin D, the ingredients before admixture to form the batter are subjected to an irradiaton operation.

The thus prepared rye batter is next caused to be converted into articles of desired forms. This may be done by introducing the batter into an extruding or depositing machine of the type commonly used in the cracker and cookie industries and may utilize any known method of forming the desired shapes. In general this will be done by dies, cast or otherwise formed to give the proper shape. This depositing machine is adapted to yield individual batter forms which retain their separate identities throughout the remaining steps of the process and which are not subjected to any further forming steps. These batter forms may be made in any of the known shapes other than crackers and biscuits, such as circular, annular, square or rectangular wafers, elongated cylindrical rods, or flat wafers having corrugated or otherwise irregular edges. Ornamental designs or lettering may be formed on one or more surfaces if desired.

The batter forms issuing from the depositing machine are, in the preferred embodiment of my invention, deposited directly on to a supporting surface which may be either a stationary reticulated pan or a travelling reticulated screen. When such pan or screen is employed, I have found that flour dusting is unnecessary, since the forms do not adhere tightly to the reticulated surface. Furthermore, the batter forms do not undergo any subsequent forming treatment as is the case in prior processes, so do not require the same precautions against sticking which is necessitated when subsequent forming operations are to be performed. For the most part, I have found that no sticking difficulties are encountered when using a perfectly dry reticulated supporting surface or wire mesh pan or conveyor. With certain types of batter some tendency to stick may be observed, and in this case it is desirable to lightly grease the reticulated receiver.

The batter forms are carried on the reticulated pans or travelling reticulated screen to a point from which they enter a baking oven. If reticulated pans are used, the pans may be manually transferred to the oven. On the other hand, if a travelling reticulated screen is employed, I find it convenient to arrange it so as to carry the batter forms directly into and through the baking oven. The oven itself is of conventional type, and proper baking is secured through control of temperature and of the speed with which the pans or travelling screen are permitted to pass through.

With crisp whole rye products, it is important that adequate dehydration be secured immediately after the baking step, as otherwise the products are heavy and soggy and are lacking in crispness. I therefore provide a drying oven through which the cookies are passed just after passing through the baking oven. Here again, the oven design and control are conventional and will be well understood by anyone skilled in the baking art.

After dehydration of the baked rye products, they are permitted to cool to normal temperature and are then ready for packaging. Preferably, the dehydrated baked rye products are passed through a conventional cooling unit before being packaged.

While I find it a very considerable advantage to avoid flour dusting, by use of a depositing machine together with the reticulated pans or screens my invention contemplates the optional use of trays or conveyor belts, in which case flour dusting or greasing will be necessary to avoid sticking.

Seasoning or flavoring materials may conveniently be applied to the surface of the batter forms before they are introduced into the baking oven. Any suitable dispensing apparatus may be used for this purpose. Materials which may be added in this way include aromatic seeds such as caraway, poppy, sesame, celery, anise, fennel and the like.

In place of irradiating the ingredients before admixture to form the rye batter, the baked rye products after dehydration may be irradiated so as to increase their nourishing qualities.

My process is represented diagrammatically in the accompanying drawings, in which:

Figure 1 shows an assembly of apparatus for producing rye products of desired form. The ingredients of the rye batter mix are introduced into the mixer wherein the mix is beaten or aerated or beated and aerated until a light, fluffy rye batter is formed, the mixer being at the upper left-hand corner of the diagram. From the mixer, the light fluffy rye batter is discharged into the hopper of the depositing machine directly below, which contains a forming die in its lower portion. This die deposits formed batter articles of desired form, either cookies, wafers or sticks onto the reticulated pans passing by underneath, on the endless belt conveyor. A seasoning hopper is mounted to the right of the depositor, and is adapted to dispense a predetermined amount of seasoning seeds or other material onto the surface of the batter articles. As the reticulated pans arrive at the end of the conveyor, the batter articles are removed manually and inserted into the reel oven. After baking, the baked articles are removed from the oven and placed on the conveyor which passes through the drying unit. As the baked articles are carried out of the drier, they fall onto another endless belt conveyor which carries them through the cooling unit and thence to the packaging operation.

Figure 2:
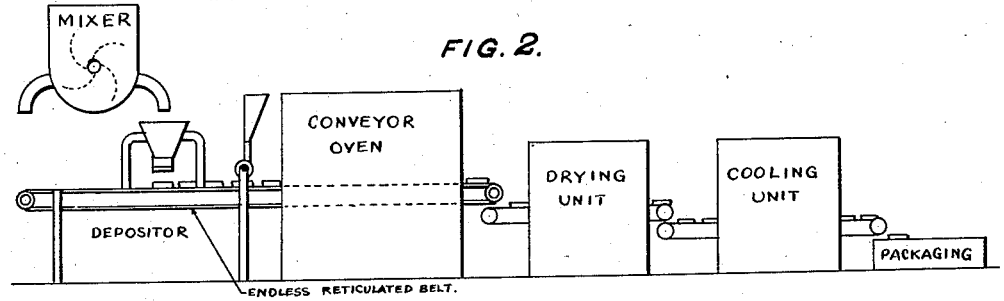

Figure 2 is a diagrammatic representation of an assembly of apparatus performing my process in exactly similar fashion except that an endless reticulated belt is used in place of the reticulated pans shown in Figure 1. When the belt is employed, it carries the batter articles of the predetermined form issuing from the depositor through the baking oven and then discharges them onto the conveyor leading to the drying unit. The process thus becomes continuous throughout and all manual handling of the molded articles prior to packaging is dispensed with.

Figure 3:
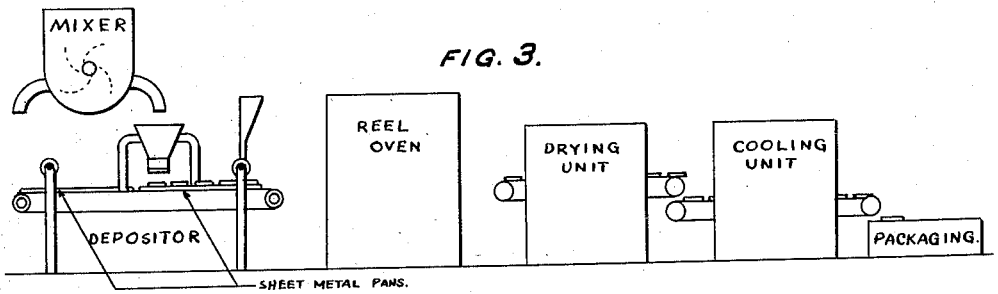

Figure 3 shows a process similar to that of Figure 1 except that sheet metal pans are employed instead of reticulated pans. It is then necessary either to grease the pans or to dust the pans with flour before depositing the batter articles of the desired form thereon. For this latter purpose, a flour duster is shown diagrammatically above the left end of the conveyor belt.

Figure 4:
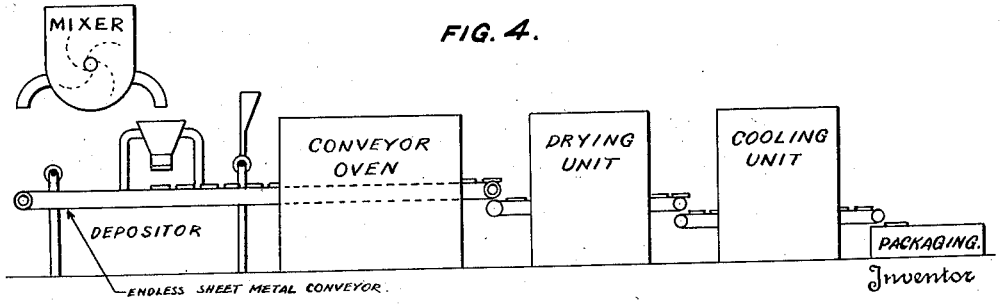

Figure 4 shows a process like that of Figure 3 except that an endless sheet metal conveyor is used to make the process continuous. Except for the use of the sheet metal conveyor and for the addition of the flour duster, it is exactly the same as the process shown in Figure 2.

While I have described specific embodiments of my process, it is to be understood that many variations may be made therein without departing from the essential spirit or scope of the invention. Accordingly, this invention is to be limited only as set forth in the appended claims.

I claim:

1. The process for making rye products which comprises forming a light batter consisting primarily of rye flour, extruding the batter into articles of predetermined form, depositing the extruded articles onto a reticulated supporting surface, baking the extruded articles while supported on said surface, and subjecting the thus baked articles to dehydration to convert same to the desired degree of crispness.

2. The process of making rye products which comprises forming a light batter consisting primarily of rye flour, extruding the batter into articles of predetermined form, depositing the extruded articles onto a reticulated supporting surface, baking the extruded articles while supported on said surface, subjecting the thus baked articles to dehydration to convert same to the desired degree of crispness, and cooling the dehydrated articles.

3. The process for making rye products which comprises forming a light irradiated batter consisting primarily of rye flour, extruding the batter into articles of predetermined form, depositing the extruded articles onto a reticulated supporting surface, baking the extruded articles while supported on said surface, and subjecting the thus baked articles to dehydration to convert same to the desired degree of crispness.

4. The process for making rye products which comprises forming a light irradiated batter consisting primarily of rye flour, extruding the batter into articles of predetermined form, depositing the extruded articles onto a reticulated supporting surface, baking the extruded articles while supported on said surface, subjecting the thus baked articles to dehydration to convert same to the desired degree of crispness, and cooling the dehydrated articles.

ADOLPH T. JOHNSON.

REFERENCES CITED

The following references are of record in the file of this patent:

UNITED STATES PATENTS

| Number | Name | Date |
|---|---|---|
| 789,770 | Swanlund | May 16, 1905 |
| 1,529,107 | Bakus | Mar. 10, 1925 |
| 1,863,277 | McGroarty | June 14, 1932 |
| 1,928,397 | Shumway | Sept. 26, 1933 |
| 2,041,091 | Savy | May 19, 1936 |
| 2,173,000 | Holtzman et al. | Sept. 12, 1939 |
| 2,206,619 | Schreier | July 2, 1940 |

FOREIGN PATENTS

| Number | Country | Date |
|---|---|---|
| 495,688 | Great Britain | May 16, 1905 |

OTHER REFERENCES

Educator Crackers, Johnson Educator Food Co., pages 10 and 11.

Lord: Everbody's Cook Book, 1 ed., Henry Holt & Co., 1924, page 165.